(12) United States Patent
Kangas

(10) Patent No.: US 8,179,077 B2
(45) Date of Patent: May 15, 2012

(54) FREQUENCY CONVERTER

(75) Inventor: Jani Kangas, Espoo (FI)

(73) Assignee: ABB Oy, Helsinki (FI)

( * ) Notice: Subject to any disclaimer, the term of this patent is extended or adjusted under 35 U.S.C. 154(b) by 711 days.

(21) Appl. No.: 12/245,066

(22) Filed: Oct. 3, 2008

(65) Prior Publication Data

US 2009/0096408 A1    Apr. 16, 2009

(30) Foreign Application Priority Data

Oct. 9, 2007    (FI) .................................. 20075716

(51) Int. Cl.
*G05D 23/275* (2006.01)
(52) U.S. Cl. ......................... 318/632; 318/569
(58) Field of Classification Search ................. 318/569, 318/600, 632, 461
See application file for complete search history.

(56) References Cited

U.S. PATENT DOCUMENTS

| | | | | |
|---|---|---|---|---|
| 4,817,471 A | * | 4/1989 | Tury | 477/125 |
| 5,086,870 A | * | 2/1992 | Bolduc | 180/333 |
| 5,553,684 A | * | 9/1996 | Bolduc | 180/333 |
| 7,185,881 B2 | * | 3/2007 | Drarvik et al. | 254/267 |
| 7,288,929 B2 | * | 10/2007 | Prsha et al. | 324/127 |
| 2003/0090225 A1 | | 5/2003 | Posma et al. | |
| 2004/0227725 A1 | * | 11/2004 | Calarco et al. | 345/156 |
| 2005/0253125 A1 | | 11/2005 | Drarvik et al. | |
| 2005/0282128 A1 | | 12/2005 | Brinkerhoff et al. | |
| 2007/0242042 A1 | * | 10/2007 | Kelly | 345/161 |

OTHER PUBLICATIONS

Finnish Search Report dated Aug. 14, 2008 (with English language translation of category of cited documents).

* cited by examiner

*Primary Examiner* — Rina Duda

(74) *Attorney, Agent, or Firm* — Buchanan Ingersoll & Rooney PC

(57) ABSTRACT

The present invention relates to a frequency converter comprising electric power supply devices for supplying electric power to an electric motor (26) to be connected to the frequency converter, a controller configured to control the electric power supply. In order to control the electric power supply, the frequency converter comprises a joystick (22) for conveying control signals to the controller, the joystick (22) comprising an acceleration sensor for registering movements of the joystick (22) and for generating control signals representing the movements, and a switch (24) for triggering a control cycle during which the controller receives the control signals generated by the joystick (22) for utilizing the control signals in controlling of the electric power supply.

7 Claims, 2 Drawing Sheets

FREQUENCY CONVERTER

FIELD OF THE INVENTION

The present invention relates to a frequency converter, and particularly to a solution which enables a user to control operation of a frequency converter.

DESCRIPTION OF PRIOR ART

Solutions are previously known wherein a frequency converter is equipped with a panel provided with push buttons to be utilized by a user so as to control electric power supply of the frequency converter. Typically, such push buttons are used for entering parameters and/or macros into a memory of a controller of the frequency converter. During use, the controller of the frequency converter controls the electric power supply according to these parameters.

A drawback of the aforementioned known solution is poor userfriendliness. It is a cumbersome and slow process to program parameters of a frequency converter, especially if the electric power supply of the frequency converter in question is to be changed frequently.

SUMMARY OF THE INVENTION

An object of the present invention is to alleviate the above-described problem and to provide a solution which enables a user to influence control of electric power supply of a frequency converter in a simpler and faster manner. This object is achieved by a frequency converter according to independent claim 1.

The invention utilizes a joystick which includes an acceleration sensor and which, during a control cycle, generates control signals to a controller of a frequency converter to be utilized by the controller of the frequency converter in controlling electric power supply. The joystick provides a user with a possibility to influence the electric power supply by taking the joystick in his or her hand and moving it by movements of the hand representing functions desired by the user. Thus the user, in a very fast and efficient manner, is capable of indicating to the frequency converter the way in which the electric power supply is to be controlled. Next, by means of a display and a keypad, the user may fine-tune the control signals generated to the frequency converter with the joystick in order to make, in a fast and simple manner, the electric power supply exactly as desired.

Preferred embodiments of the frequency converter according to the invention are disclosed in the attached dependent claims.

BRIEF DESCRIPTION OF THE FIGURES

In the following, the invention will be explained in closer detail by way of example and with reference to the accompanying figures, in which.

DESCRIPTION OF AT LEAST ONE EMBODIMENT

Figure 1:
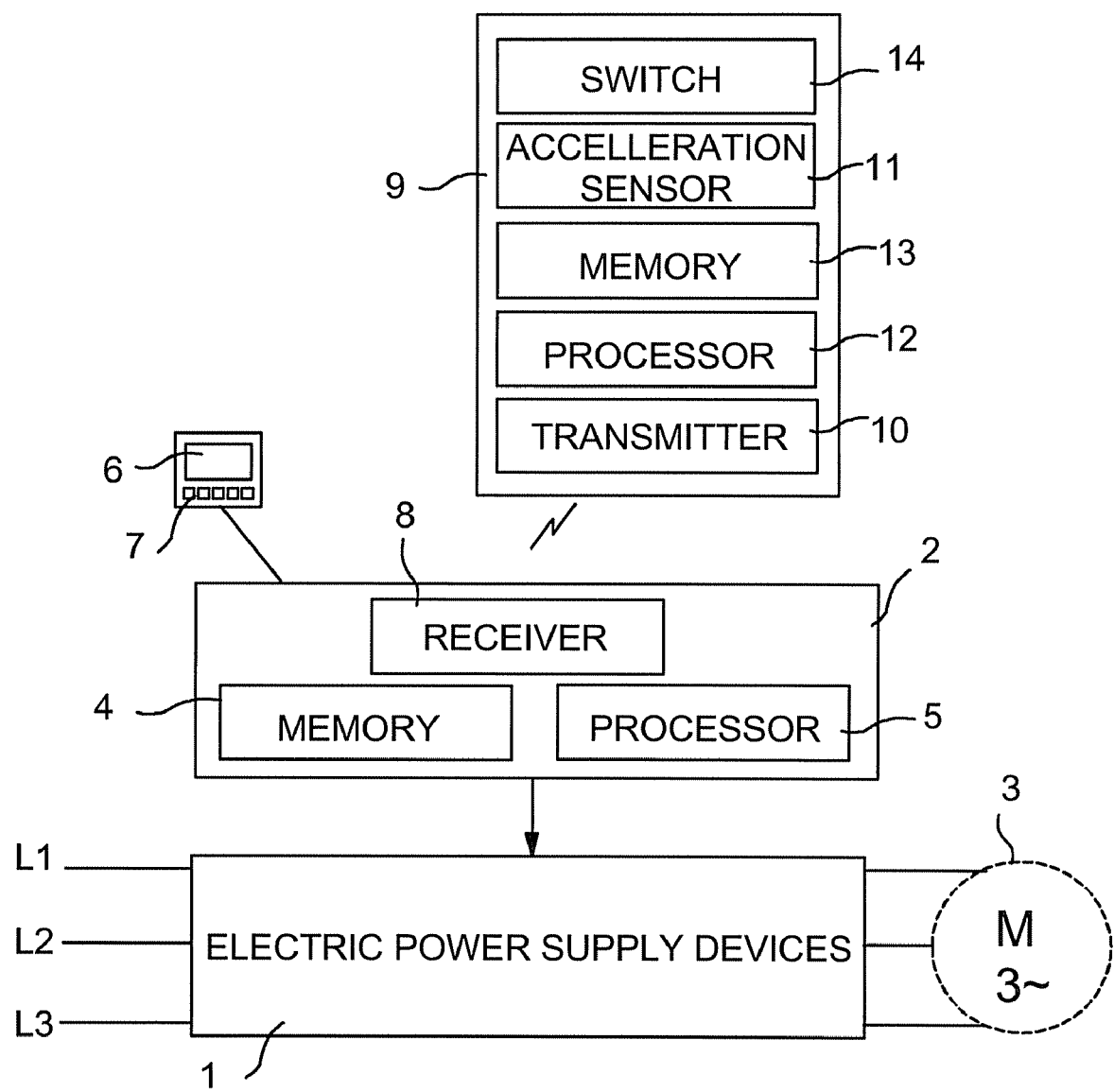
FIG. 1 illustrates a first embodiment of a frequency converter.

FIG. 1 illustrates a first embodiment of a frequency converter.

The frequency converter of FIG. 1 comprises electric power supply devices 1 which, controlled by a controller 2, supply electric power to an electric motor 3. According to prior art, the electric power supply devices 2 may include e.g. a rectifier, an intermediate circuit for filtering by a low-pass filter a pulsating direct voltage received from the rectifier or for converting such a voltage into direct current by a smoothing choke, and an inverter which converts the direct current of the intermediate circuit into an alternating current of a desired frequency.

In the example of FIG. 1, the controller includes a memory 4 and a processor 5 which, on the basis of information stored in the memory 4, controls the electric power supply devices 1.

FIG. 1 shows that the frequency converter also includes an operation panel provided with a display 6 and a keypad 7. However, no such operation panel is necessary in all embodiments. Instead of a fixed operation panel, the frequency converter may be connected to a separate operation panel or, alternatively, to a separate display and keypad while the control signals stored in the memory of the controller of the frequency converter are being browsed and modified.

The frequency converter of FIG. 1 is provided with a receiver 8 which, via a wireless connection, receives control signals from a transmitter 10 of a joystick 9. The transmitter and the receiver may utilize e.g. radio frequency signals. The receiver 8 does not necessarily have to reside in the controller itself, as shown by way of example in FIG. 1, but it may also reside in another part of the frequency converter, transmitting received control signals to the controller therefrom.

The joystick 9 comprises an acceleration sensor 11 which registers movements of the joystick 9 and generates control signals representing the movements. The operation of the joystick 9 is controlled by a processor 12 which utilizes information stored in a memory 13.

In the case of FIG. 1, a user of the frequency converter may take the joystick 9 in his or her hand and, by certain movements of the joystick, control the frequency converter to implement electric power supply to the electric motor 3 in a manner desired by the user. In such a case, the user first triggers a control cycle by setting a switch 14 in a determined position. Next, the user may e.g. move the joystick to the right so as to indicate that the frequency converter is to control the electric power supply to the electric motor 3 such that a device driven by the electric motor moves to the right. Similarly, a movement to the left indicates that the frequency converter is to control the electric power supply to the electric motor such that the device moves to the left. If the acceleration sensor 11 is a three-axle acceleration sensor, the user may move the joystick 9 in any direction such that control signals indicating the direction of movement are conveyed from the joystick 9 to the controller 2. For instance, by moving the joystick 9 forward/backward (or up/down), the user may indicate to the frequency converter that the electric power supply is to be controlled in a manner which causes the operation speed of the device to change.

Information is stored preferably in advance in the memory 4 of the controller 2 and, utilizing this information, the controller is capable of interpreting control signals it has received from the joystick 9 via the receiver 8 such that it is capable of utilizing them in controlling the electric power supply of the electric motor 3. This utilization of control signals may take place at least in the following alternative manners:

The controller 2 utilizes the control signals for changing the electric power supply real-timely in a manner indicated by a control signal. In such a case, the controller 2 immediately changes the electric power supply of the electric motor 3 in accordance with the movements of the joystick 9 provided by the user.

The controller 2 utilizes the control signals by storing them in memory for later utilization in controlling the electric power supply. In such a case, the user may store in the memory of the controller e.g. a certain macro, in this case a sequence of movements, to be utilized by the controller at a point of time to be determined later. An alternative is that after each control signal received by the controller, the controller, on the display 6, indicates to the user which control signal it has stored in the memory. Consequently, the user, by monitoring the display 6, may ensure that a correct sequence of control signals, i.e. a sequence of movements, becomes stored in the memory. Furthermore, the user may immediately or later, by using the display and the keypad, modify the stored sequence of control signals.

The controller 2 utilizes the control signals for changing the electric power supply real-timely and, additionally, it stores the control signals in memory for later utilization. This enables the user e.g. to store a given macro, in this case a sequence of movements, in the memory of the controller. After every movement, the user sees that the controller has received a correct control signal and stored it in the memory, since in connection with every received control signal the controller 2 changes the electric power supply of the electric motor such that a device driven by the electric motor 3 undergoes a change desired by the user. Also in this case, the user may immediately or later, by using the display and the keypad, modify the stored sequence of control signals.

The controller 2 utilizes the control signals in browsing a menu structure and in storing parameters in memory for later utilization. This enables the user, by means of the joystick, to browse the menus shown on the display of the frequency converter, to move to a desired menu and within this menu, by using the joystick, to select e.g. on the display entering a desired parameter and storing it in memory.

If the user, by means of the controller, has stored a macro in the memory of the controller 2 as described above, the controller may provide the user with a possibility to later browse and change the stored macro by means of the display 6 and the keypad 7 of the panel. When the stored macro is as desired by the user, he or she may, e.g. by bringing the switch 14 into an alternative position, trigger activation of the macro, formed by the control signals in the memory, in controlling the electric power supply. The joystick thus enables a rough and fast pre-programming to be carried out, which subsequently makes it possible, by using the display 6 and the keypad 7, to fine-tune the control signals stored by means of the joystick, e.g. for setting timings or for multiplying the speed of a programmed sequence of movements.

According to the invention, the above-described programming of electric power supply may be utilized for programming certain sequences of movements, i.e. "strokes", to be utilized later, triggered by the joystick. In such a case, first, the joystick may be used for carrying out the aforementioned rough and fast pre-programming, whereafter the sequence of movements formed by the control signals stored in the memory is fine-tuned as desired by means of the keypad and the display. Lastly, a predetermined trigger condition is determined. Such a trigger condition for a given sequence of movements stored in memory may be e.g. moving the joystick back and forth left-right-left, whereby control signals corresponding with the trigger condition are stored in memory. When the controller later receives from the joystick the control signals corresponding with the particular trigger condition, it detects that this is a predetermined trigger condition for a sequence of movements stored in its memory in advance, whereupon by means of the electric motor connected to the frequency converter, it starts controlling the electric power supply in order to implement the particular sequence of movements.

Figure 2:
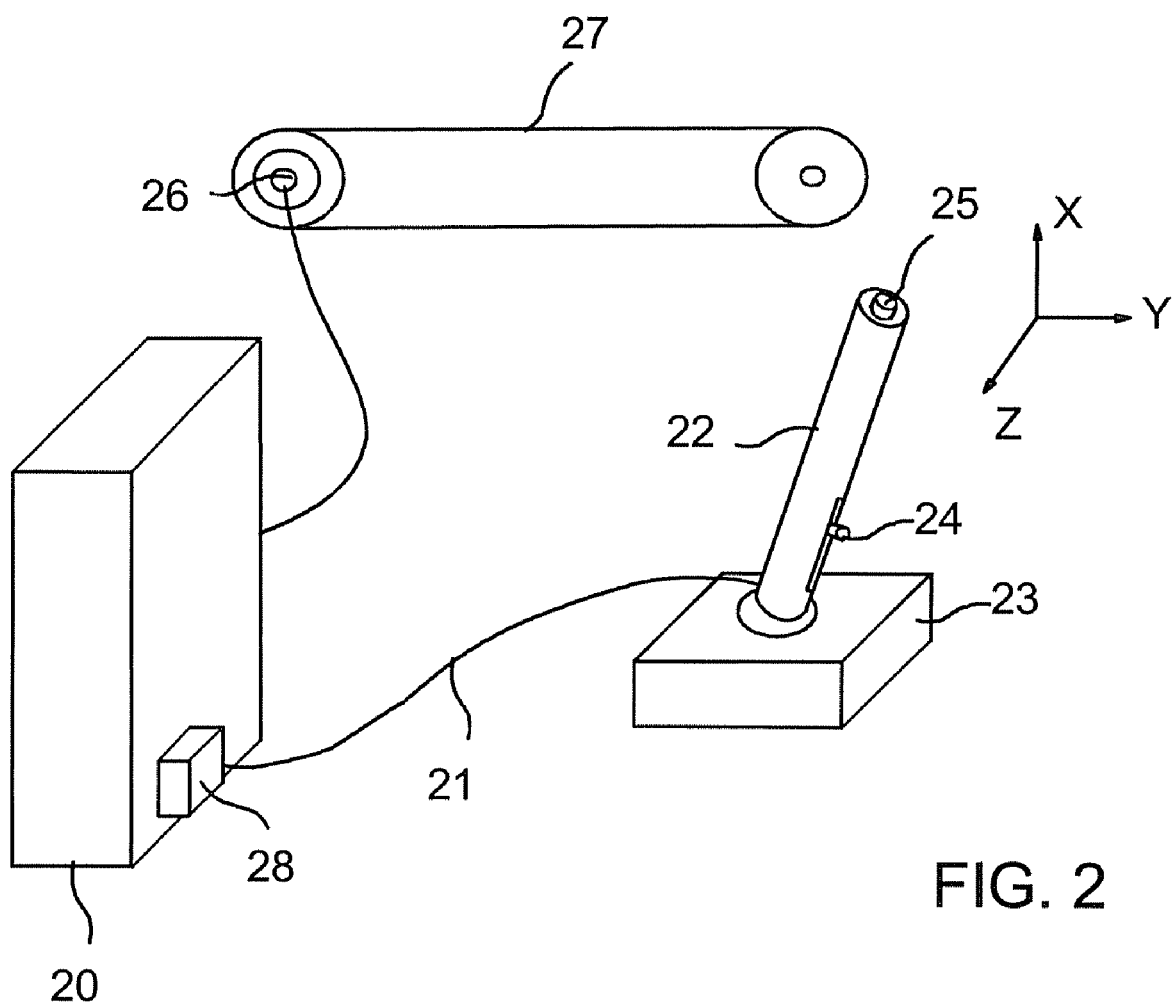
FIG. 2 illustrates a second embodiment of the frequency converter.

FIG. 2 illustrates a second embodiment of the frequency converter. The embodiment of FIG. 2 is highly similar to that of FIG. 1, so in the following, the embodiment of FIG. 2 will be described mainly by showing differences between these embodiments.

FIG. 2 shows an electric installation cabinet 20 for a frequency converter, which is provided e.g. with a controller of the frequency converter. The electric installation cabinet includes an input 28, e.g. for a detachable panel, a USB (Universal Serial Bus) connector, a standard analogy I/O interface or another suitable connector to which a joystick 22 is connected via a cable 21. The solution being a wired one, no transmitter like that shown in FIG. 1 is necessary in the joystick 22. Via another cable, the frequency converter is connected to an electric motor 26, which in this example uses e.g. a belt 27. The frequency converter of the figure is thus responsible for the electric power supply of the electric motor 26.

Also in this embodiment it is by way of example assumed that the joystick 22 is provided with a three-axle acceleration sensor. The joystick 22 may be removed from a base 23, whereafter a user may freely move it in his or her hand. Using a switch 24 and a button 25, the user may set the joystick 22 in a desired operational mode.

By moving the switch 24 the user may select different control modes:

1. In this mode, the zero point of control is set by shortly pressing the button 25 once. Next, inclinations and movements in an XYZ space cause control adjustments on one or more motors 26. When necessary, the zero point may be locked using e.g. a separate button. Any angle may be freely selected as the zero point of the joystick 22.

2. In this mode, the zero point of control is always determined by the moment at which the button 25 is pressed all the way. As long as the button 25 is being pressed all the way, control commands in the form of control signals are transmitted to the control unit of the frequency converter.

This mode may also be used for identifying "strokes":

When a given pattern is drawn in the air by keeping the button 25 pressed all the way, e.g. a circular pattern drawn clockwise, the motor 26 changes its direction correspondingly. For instance, a back and forth movement stops the device.

In addition, in this mode the controller may identify patterns written in the air by the user, such as numbers. This may also be used for entering parameters into the controller of the frequency converter, which stores the entered parameters in memory to be utilized in controlling the electric power supply of the electric motor.

When desired, the user may also teach the device different "strokes" of his or her own.

3. This mode is a "control mode" or a "teach mode". The process of teaching the control starts e.g. when the button 25 is pressed once. Next, the logic of the joystick 22 stores all acceleration changes in memory at a given interval. When the user has performed the desired movements, the "control mode" or "teach mode" is stopped by pressing the button 25 again. This teaching operation enables macros to be stored quickly. When necessary, the macros may be received as a script on the display of the frequency converter, in which case they may be fine-tuned.

4. In this mode, pressing the button 25 causes the control macro stored in the "control mode" or "teach mode" to be performed.

It is to be understood that the above description and the related figures are only intended to illustrate the present invention. It will be obvious to one skilled in the art that the invention may be varied and modified in different ways without deviating from the scope of the invention.

The invention claimed is:

1. A frequency converter comprising:
   electric power supply devices for supplying electric power to an electric motor to be connected to the frequency converter;
   a controller configured to control the electric power supply;
   a joystick for conveying control signals to the controller, the joystick comprising an acceleration sensor for registering movements of the joystick and for generating control signals representing the movements;
   a switch for triggering a control cycle during which the controller receives the control signals generated by the joystick and stores the control signals in a memory; and
   a display and a keypad for browsing and modifying the control signals stored in the memory for utilizing the modified control signals later in controlling of the electric power supply.

2. A frequency controller as claimed in claim 1, wherein the controller utilizes the control signals for changing the electric power supply in real-time in a manner indicated by the control signals.

3. A frequency controller as claimed in claim 1, wherein the controller is configured to provide a user with a user interface, by using the display and the keypad, to browse and modify the control signals for multiplying a speed of a sequence of movements indicated by the control signals.

4. A frequency controller as claimed in claim 3, wherein the switch has an alternative position for triggering utilization of the control signals stored in the memory in controlling the electric power supply.

5. A frequency controller as claimed in claim 1, wherein a predetermined trigger condition is stored in the memory, and the frequency converter is configured to control the electric power supply in accordance with a sequence of movements formed by such control signals and stored in the memory when the controller identifies the trigger condition by control signals conveyed from the joystick.

6. A frequency controller as claimed in claim 1, wherein the acceleration sensor is a three-axle acceleration sensor which three-dimensionally registers the movements of the joystick.

7. A frequency controller as claimed in claim 1, wherein the joystick comprises a transmitter which, via a wireless connection, transmits control signals to a receiver arranged in connection with the controller.

* * * * *